United States Patent
Kim

(10) Patent No.: US 11,820,443 B2
(45) Date of Patent: Nov. 21, 2023

(54) APPARATUS AND METHOD FOR CONTROLLING MOTOR DRIVEN POWER STEERING

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 330 days.

(21) Appl. No.: 17/244,878

(22) Filed: Apr. 29, 2021

(65) Prior Publication Data

US 2021/0347406 A1  Nov. 11, 2021

(30) Foreign Application Priority Data

May 6, 2020 (KR) .................. 10-2020-0053750

(51) Int. Cl.
  *B62D 5/04* (2006.01)
  *B62D 6/10* (2006.01)

(52) U.S. Cl.
  CPC .............. *B62D 5/0463* (2013.01); *B62D 6/10* (2013.01)

(58) Field of Classification Search
  CPC ...... B62D 5/0463; B62D 6/10; B62D 15/025; B62D 5/0481; B62D 5/0484; B62D 6/002;

(Continued)

(56) References Cited

U.S. PATENT DOCUMENTS 9,758,191 B2*  9/2017  Kim ............... B62D 15/021
10,173,725 B2*  1/2019  Heo ............... B62D 15/025
(Continued)

FOREIGN PATENT DOCUMENTS

CN  100519301 C  *  7/2009  ........... B62D 15/021
CN  1974295 B  *  6/2010  ............. B62D 5/003
(Continued)

OTHER PUBLICATIONS

"Modification of vehicle handling characteristics via steer-by-wire;" Yih et al.; IEEE Transactions on Control Systems Technology (vol. 13, Issue: 6, pp. 965-976); Nov. 1, 2005. (Year: 2005).*

(Continued)

*Primary Examiner* — Khoi H Tran
*Assistant Examiner* — Jorge O Peche
(74) *Attorney, Agent, or Firm* — DLA PIPER LLP (US)

(57) ABSTRACT

An apparatus for controlling an MDPS may include: a steering angle position control unit configured to compensate a first steering angle error corresponding to the difference between a command steering angle from an autonomous driving system and a first current steering angle from a steering angle sensor, and output a first command current; and a responsiveness improvement unit configured to compensate a second steering angle error corresponding to the difference between the command steering angle and a second current steering angle from a motor, and apply the compensated value to the steering angle position control unit, wherein the steering angle position control unit applies the compensated value to the first command current, and outputs a second command current.

18 Claims, 2 Drawing Sheets

(58) Field of Classification Search
CPC .............. B62D 15/0235; B60W 10/20; B60W 2050/0055
See application file for complete search history.

(56) References Cited

U.S. PATENT DOCUMENTS

| | | | | |
|---|---|---|---|---|
| 11,358,629 | B2* | 6/2022 | Kim | G05D 1/0223 |
| 11,358,630 | B2* | 6/2022 | Kim | B62D 1/16 |
| 2009/0030573 | A1* | 1/2009 | Mikamo | B62D 6/003 701/41 |
| 2009/0192679 | A1* | 7/2009 | Kobayashi | B62D 5/0472 701/42 |
| 2015/0239495 | A1* | 8/2015 | Kameda | B62D 5/0469 701/41 |
| 2016/0129934 | A1* | 5/2016 | Akatsuka | B62D 15/025 180/446 |
| 2018/0194390 | A1* | 7/2018 | Goto | B62D 5/046 |
| 2018/0281849 | A1* | 10/2018 | Irie | B62D 6/008 |
| 2019/0002022 | A1* | 1/2019 | Kim | B62D 5/0466 |
| 2019/0084613 | A1* | 3/2019 | Tsubaki | B62D 1/286 |
| 2020/0010111 | A1* | 1/2020 | Tsubaki | B62D 5/0463 |
| 2020/0130727 | A1* | 4/2020 | Kim | B62D 15/025 |
| 2020/0391788 | A1* | 12/2020 | Kim | B62D 5/0463 |
| 2021/0009194 | A1* | 1/2021 | Kim | B62D 1/16 |
| 2021/0061313 | A1* | 3/2021 | Kim | B60W 10/20 |
| 2021/0261190 | A1* | 8/2021 | Toda | B62D 5/0409 |
| 2021/0276616 | A1* | 9/2021 | Inden | B62D 15/025 |
| 2021/0323579 | A1* | 10/2021 | Kim | G05D 1/0061 |
| 2021/0331734 | A1* | 10/2021 | Kim | B62D 15/025 |
| 2021/0347406 | A1* | 11/2021 | Kim | B62D 6/002 |
| 2021/0382487 | A1* | 12/2021 | Kim | G05D 1/0212 |
| 2022/0009549 | A1* | 1/2022 | Kim | G01P 3/481 |
| 2022/0009550 | A1* | 1/2022 | Kim | B62D 15/025 |
| 2022/0063716 | A1* | 3/2022 | Kim | B60W 60/001 |
| 2022/0144336 | A1* | 5/2022 | Kim | G05B 13/024 |
| 2022/0185368 | A1* | 6/2022 | Kim | B62D 5/0472 |
| 2023/0040500 | A1* | 2/2023 | Kim | B62D 15/025 |
| 2023/0126269 | A1* | 4/2023 | Kim | B62D 15/021 701/23 |

FOREIGN PATENT DOCUMENTS

| | | | | |
|---|---|---|---|---|
| CN | 104583056 | A * | 4/2015 | ........... B62D 15/025 |
| CN | 112441111 | A * | 3/2021 | ........... B60W 10/20 |
| CN | 113928411 | A * | 1/2022 | ........... B62D 5/0463 |
| DE | 102015102630 | A1 * | 8/2015 | ........... B62D 5/0466 |
| EP | 2019022 | A1 * | 1/2009 | ............ B62D 5/008 |
| EP | 2937266 | A1 * | 10/2015 | ........... B62D 15/025 |
| EP | 3403905 | A1 * | 11/2018 | ............ B62D 1/286 |
| EP | 3939862 | A1 * | 1/2022 | |
| EP | 4001054 | A1 * | 5/2022 | ........... B62D 15/025 |
| JP | H0510160 | U * | 2/1993 | |
| JP | H05216536 | A * | 8/1993 | |
| JP | H0755798 | B2 * | 6/1995 | |
| JP | H10258756 | A * | 9/1998 | |
| JP | 2001341662 | A * | 12/2001 | |
| JP | 2003170850 | A * | 6/2003 | |
| JP | 2006215626 | A * | 8/2006 | |
| JP | 4554828 | B2 * | 9/2010 | |
| KR | 2019-0098783 | | 8/2019 | |
| KR | 102317921 | B1 * | 10/2021 | |
| KR | 20210128531 | A * | 10/2021 | |
| KR | 20210157506 | A * | 12/2021 | |
| KR | 20220064445 | A * | 5/2022 | |
| KR | 20220144460 | A * | 10/2022 | |
| KR | 20220167073 | A * | 12/2022 | |
| KR | 20230023081 | A * | 2/2023 | |
| WO | WO-2017164105 | A1 * | 9/2017 | ............ B62D 1/286 |
| WO | WO-2023274493 | A1 * | 1/2023 | |

OTHER PUBLICATIONS

"Robust control of low-cost actuator for automotive active front steering application;" Namuduri et al.; 2009 IEEE Energy Conversion Congress and Exposition (pp. 2108-2114); Sep. 1, 2009. (Year: 2009).*

"Automated Lane Changing With a Controlled Steering-Wheel Feedback Torque for Low Lateral Acceleration Purposes;" Loof et al.; IEEE Transactions on Intelligent Vehicles (vol. 4, Issue: 4, pp. 578-587); Jan. 10, 2020. (Year: 2020).*

"Yaw Stability Control Design Through a Mixed-Sensitivity Approach;" Cerone et al.; IEEE Transactions on Control Systems Technology (vol. 17, Issue: 5, pp. 1096-1104); Jan. 14, 2010. (Year: 2010).*

* cited by examiner

APPARATUS AND METHOD FOR CONTROLLING MOTOR DRIVEN POWER STEERING

CROSS-REFERENCE TO RELATED APPLICATION

This application claims priority from and the benefit of Korean Patent Application No. 10-2020-0053750, filed on May 6, 2020, which is hereby incorporated by reference for all purposes as if set forth herein.

BACKGROUND

Field

Exemplary embodiments of the present disclosure relate to an apparatus and method for controlling an MDPS (Motor Driven Power Steering), and more particularly, to an apparatus and method for controlling an MDPS, which can raise instantaneous responsiveness when sudden steering is required in a belt R MDPS during autonomous driving, and stably maximize performance.

Discussion of the Background

In general, a hydraulic power steering apparatus using hydraulic pressure of a hydraulic pump has been used as a power assisted steering apparatus of a vehicle. After the 1990s, however, MDPS systems using an electronic motor have been universally used.

In the existing hydraulic power steering apparatus, the hydraulic pump serving as a power source to provide power is driven by an engine, and always consumes energy regardless of whether a steering wheel is turned. In the MDPS system, however, the motor driven by electronic energy provides steering assist power when the steering wheel is turned to generate torque.

Therefore, when the MDPS (or motor driven steering apparatus) is used, the energy efficiency of the vehicle can be improved further than when the hydraulic power steering apparatus is used.

When a risk of collision or another accident suddenly occurs during autonomous driving, a vehicle to which an autonomous driving mode is applied needs to avoid an obstacle by reducing vehicle speed or performing steering control. However, the vehicle to which the existing autonomous driving mode is applied is only designed to cope with a typical situation in which an obstacle is detected at a designated distance in advance, but not designed to cope with an emergency situation (e.g. a situation in which a pedestrian or another vehicle suddenly appears ahead of the vehicle).

Therefore, in case of a non-emergency situation, it is typically effective to reduce the vehicle speed in advance. However, in case of an emergency situation (e.g. a situation in which a pedestrian or another vehicle suddenly appears), it may be more effective to perform sudden steering, in order to avoid an accident. However, when the autonomous driving mode is disabled or abnormally performed in such an emergency situation as in the vehicle to which the existing autonomous driving mode is applied, a driver (or user) may be placed in a more dangerous situation. Therefore, there is a need for technology capable of maximizing responsiveness such that steering can be instantaneously and quickly performed in response to an emergency situation, while the autonomous driving mode is continuously retained. At this time, a motor of the MDPS can be controlled, but a steering wheel connected to a column may be vibrated. When the responsiveness becomes extremely high regardless of intention, the control stability may be reduced. In this case, disturbance, mechanism friction or sensor noise may be caused by an external factor, and thus degrade the response performance of a controller or generate unintended vibration.

Therefore, the instantaneous responsiveness needs to be raised when sudden steering is required during autonomous driving, and the performance needs to be stably maximized despite noise caused by an external factor. For this necessity, the position control performance of the MDPS needs to be maximized, and a belt R MDPS typically uses a motor angle rather than a steering angle outputted from a steering angle sensor, in order to perform control. However, when a belt slip occurs, the belt slip may pose a greater threat to a driver. Thus, there is a need for a technology that can exhibit control performance similar to control performance when the motor angle is used, even while using the steering angle of the steering angle sensor having relatively low performance.

The related art of the present disclosure is disclosed in Korean Patent Application Publication No. 10-2019-0098783 published on Aug. 23, 2019 and entitled "Apparatus for Controlling Handle of Vehicles".

SUMMARY

Various embodiments are directed to an apparatus and method for controlling an MDPS, which can raise instantaneous responsiveness when sudden steering is required in a belt R MDPS during autonomous driving, and stably maximize performance.

In an embodiment, an apparatus for controlling an MDPS may include: a steering angle position control unit configured to compensate a first steering angle error corresponding to the difference between a command steering angle from an autonomous driving system and a first current steering angle from a steering angle sensor, and output a first command current; and a responsiveness improvement unit configured to compensate a second steering angle error corresponding to the difference between the command steering angle and a second current steering angle from a motor, and apply the compensated value to the steering angle position control unit, wherein the steering angle position control unit applies the compensated value to the first command current, and outputs a second command current.

The steering angle position control unit may include: a position controller configured to compensate the first steering angle error; a velocity controller configured to compensate a velocity error corresponding to the difference between a current steering angular velocity and a command velocity outputted from the position controller, and output the first command current; and a first calculator configured to add the compensated value to the first command current, and output the second command current.

The responsiveness improvement unit may include: a variable HPF (High Pass Filter) configured to filter the second steering angle error through high-frequency filtering by adjusting a cut-off frequency; a gain adjuster configured to adjust a gain of the variable HPF based on the difference between the first and second current steering angles; and a second calculator configured to multiply the filtered value by the adjusted gain, and apply the multiplication result as the compensated value to the steering angle position control unit.

The variable HPF may adjust the cut-off frequency by adjusting the derivative time of a transfer function.

The difference between the first and second current steering angles may occur when a belt slip occurs.

The gain adjuster may adjust the gain according to the level of the sensed belt slip.

The gain adjuster may reduce the gain as the difference between the first and second current steering angles increases.

The gain adjuster may increase the gain when the belt slip is not sensed.

The gain adjuster may adjust the gain by multiplying a load curve gain based on the difference between the first and second current steering angles, a current steering angular velocity and a preset ratio.

The apparatus may further include a current controller configured to compensate the current error between a sensor current and a command current outputted from the steering angle position control unit, and output a final command current.

In an embodiment, a method for controlling an MDPS may include: compensating, by a steering angle position control unit, a first steering angle error corresponding to the difference between a command steering angle from an autonomous driving system and a first current steering angle from a steering angle sensor, and outputting a first command current; compensating, by a responsiveness improvement unit, a second steering angle error corresponding to the difference between the command steering angle and a second current steering angle from a motor, and applying the compensated value to the steering angle position control unit; and applying, by the steering angle position control unit, the compensated value to the first command current, and outputting a second command current.

The outputting of the first command current may include: compensating, by a position controller, the first steering angle error and outputting a command velocity; and compensating, by a velocity controller, a velocity error corresponding to the difference between a current steering angular velocity and the command velocity outputted from the position controller, and outputting the first command current.

The applying of the compensated value to the steering angle position control unit may include: filtering, by a variable HPF, the second steering angle error through high-frequency filtering by adjusting a cut-off frequency; adjusting, by a gain adjuster, a gain of the variable HPF based on the difference between the first and second current steering angles; and multiplying, by a second calculator, the filtered value by the adjusted gain, and applying the multiplication result as the compensated value to the steering angle position control unit.

In the filtering of the second steering angle error through high-frequency filtering, the variable HPF may adjust the cut-off frequency by adjusting the derivative time of a transfer function.

In the adjusting of the gain of the variable HPF, the difference between the first and second current steering angles may occur when a belt slip occurs.

In the adjusting of the gain of the variable HPF, the gain adjuster may adjust the gain according to the level of the sensed belt slip.

In the adjusting of the gain of the variable HPF, the gain adjuster may reduce the gain as the difference between the first and second current steering angles increases.

In the adjusting of the gain of the variable HPF, the gain adjuster may increase the gain when the belt slip is not sensed.

In the adjusting of the gain of the variable HPF, the gain adjuster may adjust the gain by multiplying a load curve gain based on the difference between the first and second current steering angles, a current steering angular velocity, and a preset ratio.

The method may further include compensating, by a current controller, a current error between the second command current and a sensor current, outputting a final command current, and applying the final command current to an MDPS, after the outputting of the second command current.

In accordance with the embodiments of the present disclosure, the apparatus and method for controlling an MDPS may raise instantaneous responsiveness when sudden steering is required during autonomous driving of the vehicle, and stably maximize the performance despite noise caused by an external factor, thereby avoiding an accident.

DETAILED DESCRIPTION OF THE ILLUSTRATED EMBODIMENTS

Figure 1:
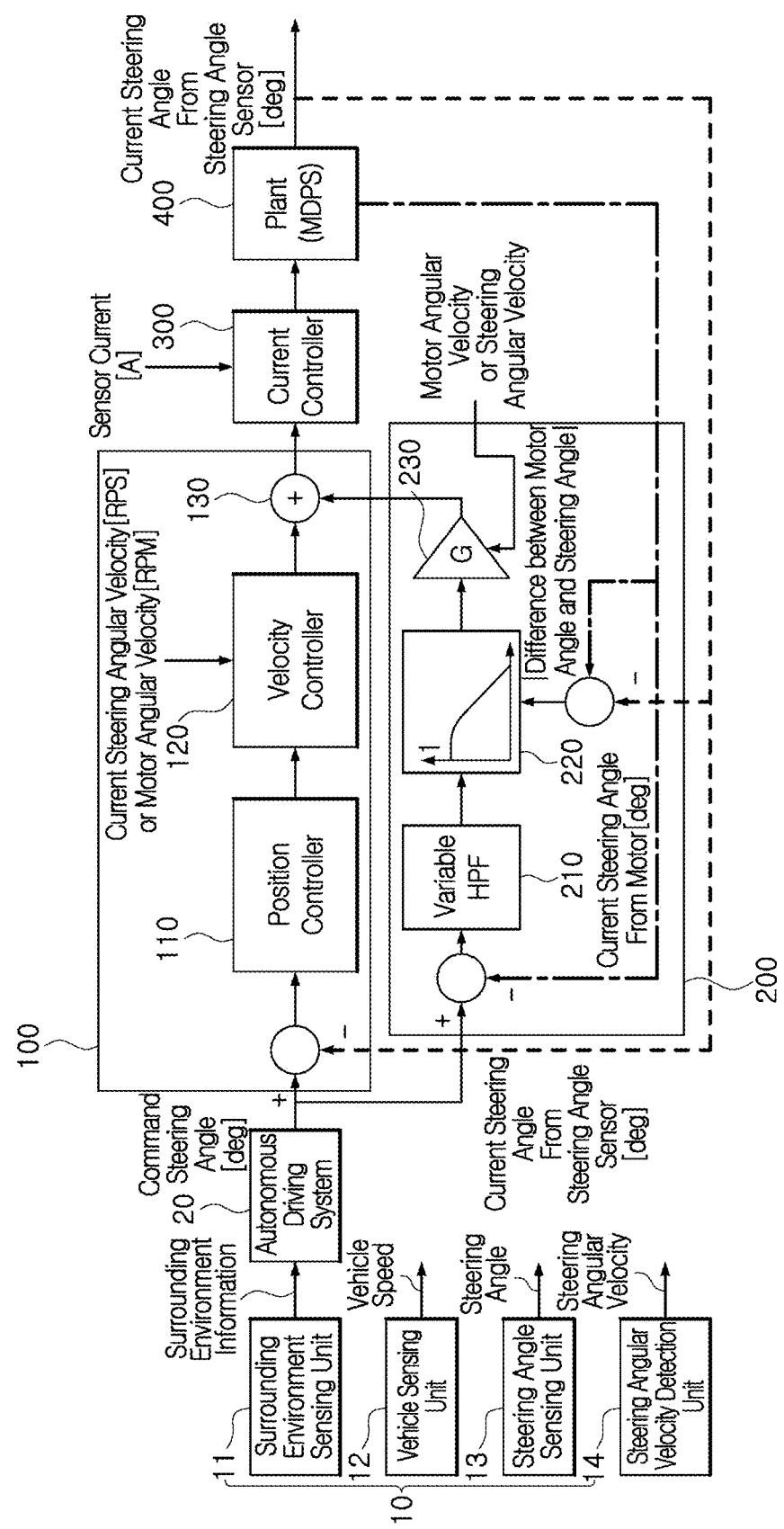
FIG. 1 is a block diagram illustrating a schematic configuration of an apparatus for controlling an MDPS in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for controlling an MDPS (Motor Driven Power Steering) will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device, such as a computer, cellular phone, PDA (Personal Digital Assistant) and another device, which facilitates information communication between end users.

FIG. 1 is a block diagram illustrating a schematic configuration of an apparatus for controlling an MDPS in accordance with an embodiment of the present disclosure.

Referring to FIG. 1, the apparatus for controlling an MDPS in accordance with the embodiment of the present disclosure includes a sensing module 10, an autonomous driving system 20, a steering angle position control unit 100, a responsiveness improvement unit 200 and a current controller 300.

The sensing module 10 senses information required for autonomous driving and steering control. The sensing module 10 may include a surrounding environment sensing unit 11, a vehicle speed sensing unit 12, a steering angle sensing unit 13 and a steering angular velocity detection unit 14. The surrounding environment sensing unit 11 may sense surrounding environment information required for an operation of the autonomous driving system 20. The vehicle speed sensing unit 12 may sense the vehicle speed of a vehicle. The steering angular velocity detection unit 14 may detect the steering angle of a steering wheel. The steering angular velocity detection unit 14 may detect the steering angular velocity of the steering wheel.

The steering angular velocity detection unit 14 may directly detect the steering angular velocity from the steering wheel, but detect the steering angular velocity by differentiating the steering angle sensed by the steering angle sensing unit 13.

Examples of the surrounding environment sensing unit 11 may include a lidar, a radar, an ultrasonic sensor, an image sensor and the like. The surrounding environment information may include road information, obstacle information, weather information and the like. The surrounding environment information is not limited to the above-described embodiment.

In the autonomous driving mode, the autonomous driving system 20 outputs a command steering angle for autonomous driving control of the vehicle, based on the surrounding environment information inputted from the surrounding environment sensing unit 11.

Since the configuration in which the autonomous driving system 20 performs autonomous driving control based on the surrounding environment information can be easily carried out by those skilled in the art, the detailed descriptions thereof will be omitted herein.

The steering angle position control unit 100 compensates a first steering angle error (i.e. first position control error) corresponding to the difference between a command steering angle and a current steering angle (hereafter, referred to as 'first current steering angle') from the steering angle sensor, and outputs a command current.

In general, autonomous driving is performed through position control over the recent steering angle. That is, when the autonomous driving system 20 applies a command steering angle to an MDPS 400, the MDPS 400 performs position control according to the command steering angle. In general, the steering angle position control unit 100 may include a position controller 110 and a velocity controller 120.

The position controller 110 may compensate the first steering angle error corresponding to the difference between the command steering angle and the first current steering angle. At this time, the position controller 110 may be configured as a P controller.

The velocity controller 120 may compensate a speed error corresponding to the difference between a current steering angular velocity and a command velocity outputted from the position controller 110. At this time, the velocity controller 120 may be configured as a PI controller, and output a first command current.

However, the steering angle position control unit 100 constituted by the position controller 110 and the velocity controller 120 has a limitation in raising responsiveness. Thus, the steering angle position control unit 100 may further include a first calculator 130 which receives a necessary current from the responsiveness improvement unit 200, adds the received current to the first command current outputted from the velocity controller 120, and outputs a second command current. The necessary current may be obtained by compensating a second steering angle error through the responsiveness improvement unit 200, the second steering angle error corresponding to the difference between the command steering angle and a current steering angle (hereafter, referred to as 'second current steering angle') from a motor.

The responsiveness improvement unit 200 may include a variable HPF 210, a gain adjuster 220 and a second calculator 230. The responsiveness improvement unit 200 may filter an error value corresponding to the difference between the command steering angle and the second current steering angle through high-frequency filtering, multiply the filtered value by a gain, and apply the multiplication result to the first calculator 130. This operation may serve to add an additional necessary current to the command current, thereby raising the responsiveness performance of the steering angle position control unit 100.

The performance of the control unit may be significantly changed depending on whether the current steering angle is sensed by the steering angle sensor or sensed through rotation of the motor. The first reason is the resolution of the sensor. The steering angle sensor may transfer a steering angle to the MDPS 400 through communication, and thus have time delay. Furthermore, the resolution of the steering angle sensor may also be several or tens of times lower than that of an encoder sensor of the motor. The second reason is that the steering angle sensor is typically mounted in a steering wheel in the case of a belt R MDPS. Thus, as a torsion bar is twisted, a steering angle sensed by the steering angle sensor may become different from an actual rotation angle of a tire. That is, when only the steering wheel is vibrated even though the tire angle is fixed, such a vibration signal may not be removed but applied to the steering angle position control unit 100. In this case, the performance of the control unit may be rather significantly reduced. Therefore, the converted second current steering angle from the motor is generally used in the steering angle position control unit 100. However, if a belt slip occurs, a difference may occur between an actual steering angle of the vehicle in operation and a steering angle controlled by the MDPS 400. In this case, the vehicle may be moved in an unintended direction. Therefore, in order to compensate the difference, the steering angle of the steering angle sensor may be used as a feedback signal of the basic steering angle position control unit 100, and the responsiveness improvement unit 200 for improving responsiveness may use a motor angle to improve both the responsiveness and the stability.

The responsiveness improvement unit 200 for improving responsiveness takes the form of the variable HPF 210. This form may correspond to the configuration to which a D controller is added. For convenience and efficiency of controller design, the responsiveness improvement unit 200 may be reconfigured as a combination of the variable HPF 210 and the gain adjuster 220.

The variable HPF 210 adjusts a cut-off frequency and filters the second steering angle error corresponding to the difference between the command steering angle and the second current steering angle through high-frequency filtering, thereby removing noise. In this case, the variable HPF 210 may adjust the cut-off frequency by adjusting the derivative time of a transfer function.

The gain adjuster 220 adjusts the gain of the variable HPF 210 based on the difference between the first current steering angle and the second current steering angle. The difference between the first and second current steering angles may occur when a belt slip occurs. Therefore, the gain adjuster 220 may adjust the gain of the HPF 210 according to the level of the sensed belt slip.

For example, the gain adjuster 220 may reduce the gain as the difference between the first and second current steering angles increases. Furthermore, when no belt slip is sensed, the gain adjuster 220 may increase the gain.

The gain adjuster 220 adjusts the gain of the variable HPF 210 using one or more of the current steering angle and the difference between the first and second current steering angles. That is, the gain adjuster 220 adjusts the gain by multiplying a load curve gain based on the difference between the first and second current steering angles, the steering angular velocity and a preset ratio. Thus, the gain adjuster 220 finally sets the gain by multiplying the load curve gain based on the difference between the first and second current steering angles, the steering angular velocity and a ratio for retaining a proper parameter. The ratio may be set to various values in consideration of various sudden steering environments under an actual autonomous driving condition. The load curve gain based on the difference between the first and second current steering angles, the steering angular velocity and the ratio are stored in a tuning map, in consideration of the control stability of the MDPS 400.

When the steering angle control performance is excessively high in a general autonomous driving mode, vibration or the like may be generated as control stability is reduced by external noise, surrounding environments or the like. In this case, the steering angle control performance may be rather degraded. Therefore, it is very important to raise the steering angle control performance as much as possible at the time of necessity.

For this operation, it is effective to use a PI-P or PID-PI controller combination without using the steering angle position control unit 100 based on a P-PI controller combination which is generally used. However, when a D controller is applied to the steering angle position control unit 100, vibration may be caused by noise of the command steering angle, the external environment or noise. In general, a D controller is added to the steering angle position control unit 100 in order to raise responsiveness to a change in position. In this case, however, disturbance or noise generated introduced from the external environment may be amplified to cause vibration. Thus, the steering angle control performance of the steering angle position control unit 100 may be rather degraded.

In order to prevent the degradation, an LPF (Low Pass Filter) or lag compensator is generally applied to the previous stage of the D controller. However, when the structure becomes complex and needs to be varied according to a steering situation, the number of parameters or factors to be changed is increased. That is, a P controller in a general P-PI controller combination for the steering angle position control unit 100 is designed as a PI or PID controller, in order to use a PI-PI or PID-PI controller combination. Thus, there is a need for a more effective method which can maximize the performance of the controller according to a steering situation, and significantly increase responsiveness while being resistant to noise or disturbance.

Typically, when an LPF or lag-compensator is applied to the D controller in the PID controller, an equation for the transfer function may be expressed as $G(s)=Kp(1+1/Ti \times s + Td \times s/(1+s \times Td))$. Here, $G(s)$ may represent the transfer function, $Kp$ may represent a proportional gain, $Ti$ may represent an integral time, $Td$ may represent a derivative time, and $s$ may represent a complex number. When the PID control gain is separated to rearrange the equation or the gain $Kp$ is separated according to the I or D controller, the equation may be expressed as $G(s)=kp+Ki/Ti \times s+Kd \times s/(1+Td \times s)$. At this time, for the D controller, the equation may be rearranged as $(1/Td)/((1/Td)+s)) \times Td \times Kp \times s$. Here, $Ki$ may represent an integral gain, and $Kd$ may represent a differential gain.

Furthermore, $(1/Td)/((1/Td)+s))$ and $s$ are similar to the form of a primary HPF. In an application, when the D controller is not applied, but the variable HPF 210 and the gain adjuster 220 are applied, it is possible to implement a structure which is resistant to noise and can raise the steering angle control performance. At this time, the gain and cut-off frequency of the variable HPF 210 are very important.

Typically, the cut-off frequency of the HPF may be set by applying the motor control bandwidth of a motor driven steering apparatus, for example, the MDPS 400. However, in order not to influence the resonance point of the torsion bar of the MDPS 400, it is important to set the cut-off frequency of the HPF with a cut-off point set to about 12 Hz in the case of C-MDPS or about 9 Hz in the case of R-MDPS. For reference, the factor that has the largest influence on the stability of the MDPS 400 is the torsion bar. This is because the torsion bar has the lowest stiffness and is the point where resonance most easily occurs.

In general, the derivative time $Td$ may define the control period and frequency of the D controller in the PID controller. In $(1/Td)/((1/Td)+s)) \times Td \times Kp \times s$ of the transfer function, $(1/Td)/((1/Td)+s))$ is equal to the form of the HPF, and can be set to a desired frequency through $1/Td$. That is, the transfer function of the general HPF may be expressed as $s/(s+w)$. Here, $w$ may be $2\pi f$, and $f$ may represent the cut-off frequency. In the above-described transfer function, $1/Td$ directly becomes $w$. Thus, the variable HPF 210 may adjust the cut-off frequency by varying $Td$, in order to set a desired frequency.

The gain adjuster 220 varies the differential gain $Kd$ in order to control the gain. As defined above, the gain adjuster 62 may vary the gain response characteristic of the responsiveness improvement unit 200 by increasing Kd as the steering angular velocity in the transfer function becomes high, and decreasing Kd as the steering angular velocity becomes low. An important factor to decide the gain is the steering angular velocity. In order to decide the load of the vehicle and a load applied to the MDPS 400, the steering angular velocity needs to be necessarily considered.

The second calculator 230 multiplies the value filtered by the variable HPF 210 through high-frequency filtering by the gain adjusted by the gain adjuster 220, and applies the multiplication result as the compensated value to the steering angle position control unit 100. Then, the steering angle position control unit 100 may apply the compensated value to the first command current, and output the second command current.

As described above, the basic steering angle position control unit 100 may use the first steering angle of the steering angle sensor, and thus maintain the sense of unity with an actual motion of the vehicle, and the part of the steering angle position control unit 100, which is configured to raise only the response performance of the controller, may use the converted steering angle from the motor, thereby removing the instability of the basic steering angle position control unit 100 due to a belt slip.

When a belt slip additionally occurred, the gain of the variable HPF 210 needs to be reduced in order to improve the responsiveness. In general, when no belt slip occurs, there is almost no difference between the steering angle of the steering angle sensor and the converted steering angle from the motor. However, when a slip occurred, the steering angle of the steering angle sensor and the converted steering angle from the motor become different from each other. When a difference occurred between the steering angles, the gain of the variable HPF 210 may be reduced to improve the response performance for safety. Only when no difference occurs, the gain of the variable HPF 210 may be raised to prevent side effects. That is, although a belt slip occurs, the basic steering angle position control unit 100 is driven as the steering angle sensor, and thus does not cause a big problem. Furthermore, since the gain is processed as the converted steering angle from the motor but is varied according to the level of the sensed belt slip, there is no problem in the stability of the controller in a failure state.

The current controller 300 compensates the current error between the sensor current and the command current outputted from the steering angle position control unit 100, and outputs a final command current. At this time, the current controller 300 may be a PI controller, and the sensor current may be a current that an MCU (not illustrated) acquires by sensing the motor.

When receiving the second command current from the steering angle position control unit 100 and receiving the sensor current from the MCU, the current controller 300 may compensate an error corresponding to the difference between the second command current and the sensor current, output the final command current, and apply the final command current to the MDPS 400.

Hereafter, a method for controlling an MDPS in accordance with an embodiment of the present disclosure will be described with reference to FIG. 2.

Figure 2:
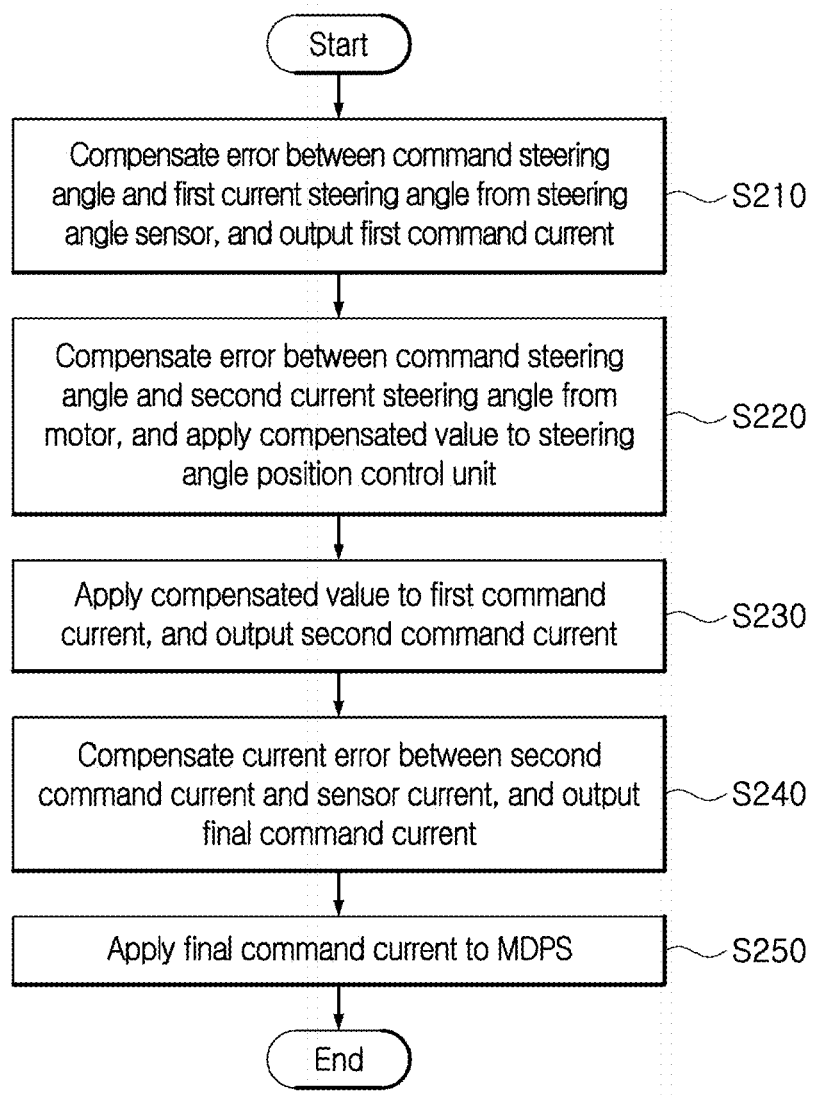
FIG. 2 is a flowchart for describing a method for controlling an MDPS in accordance with an embodiment of the present disclosure.

FIG. 2 is a flowchart for describing a method for controlling an MDPS in accordance with an embodiment of the present disclosure.

Referring to FIG. 2, the steering angle position control unit 100 compensates a first steering angle error corresponding to the difference between a command steering angle inputted from the autonomous driving system 20 and a first current steering angle inputted from the steering angle sensor, and outputs a first command current, in step S210. At this time, the position controller 110 may compensate the first steering angle error and output a command velocity, and the velocity controller 120 may compensate a velocity error corresponding to the difference between the command velocity outputted from the position controller 110 and a current steering angular velocity, and output the first command current.

When step S210 is performed, the responsiveness improvement unit 200 compensates a second steering angle error corresponding to the difference between the command steering angle and a second current steering angle from the motor, and applies the compensated value to the steering angle position control unit 100, in step S220. At this time, the variable HPF 210 may filter the second steering angle error through high-frequency filtering by adjusting a cut-off frequency, thereby removing noise. Then, the gain adjuster 220 may adjust the gain of the variable HPF 210 based on the difference between the first current steering angle and the second current steering angle. At this time, the difference between the first and second current steering angles may occur when a belt slip occurred, and the gain adjuster 220 may adjust the gain according to the level of the sensed belt slip. For example, the gain adjuster 220 may reduce the gain as the difference between the first and second current steering angles increases. Furthermore, when no belt slip is sensed, the gain adjuster 220 may increase the gain. At this time, the gain adjuster 220 may adjust the gain by multiplying a load curve gain based on the difference between the first and second current steering angles, a steering angular velocity and a preset ratio.

When step S220 is performed, the steering angle position control unit 100 applies the compensated value, applied from the responsiveness improvement unit 200, to the first command current, and outputs a second command current, in step S230. That is, the steering angle position control unit 100 may add the compensated value to the first command current, and output the second command current.

When step S230 is performed, the current controller 300 compensates the current error between a sensor current and the second command current outputted from the steering angle position control unit 100, and outputs a final command current, in step S240. Then, the current controller 300 applies the final command current to the MDPS 400 in step S250. At this time, when the second command current is received from the steering angle position control unit 100 and the sensor current is received from the MCU, the current controller 300 may compensate an error corresponding to the difference between the second command current and the sensor current, output the final command current, and apply the outputted final command current to the MDPS 400.

As such, the apparatus and method for controlling an MDPS in accordance with the embodiments of the present disclosure may raise instantaneous responsiveness when sudden steering is required during autonomous driving of the vehicle, and stably maximize the performance despite noise caused by an external factor, thereby avoiding an accident.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling an MDPS (Motor Driven Power Steering), comprising:
a steering angle position control unit configured to compensate a first steering angle error corresponding to a difference between a command steering angle from an autonomous driving system and a first current steering angle from a steering angle sensor, and output a first command current, the steering angle position control unit comprising:
a position controller configured to compensate the first steering angle error; and
a velocity controller configured to compensate a velocity error corresponding to the difference between a current steering angular velocity and a command velocity outputted from the position controller, and output the first command current; and
a responsiveness improvement unit configured to compensate a second steering angle error corresponding to the difference between the command steering angle and a second current steering angle from a motor, and apply a compensated value of the second steering angle error to the steering angle position control unit,
wherein the steering angle position control unit further comprises a first calculator configured to add the compensated value to the first command current, and output a second command current.

2. The apparatus of claim 1, further comprising a current controller configured to compensate the current error between a sensor current and a command current outputted from the steering angle position control unit, and output a final command current.

3. An apparatus for controlling an MDPS (Motor Driven Power Steering), comprising:
a steering angle position control unit configured to compensate a first steering angle error corresponding to a difference between a command steering angle from an autonomous driving system and a first current steering angle from a steering angle sensor, and output a first command current; and
a responsiveness improvement unit configured to compensate a second steering angle error corresponding to the difference between the command steering angle and a second current steering angle from a motor, and apply a compensated value of the second steering angle error to the steering angle position control unit, the responsiveness improvement unit comprising:
a variable HPF (High Pass Filter) configured to filter the second steering angle error through high-frequency filtering by adjusting a cut-off frequency;
a gain adjuster configured to adjust a gain of the variable HPF based on the difference between the first and second current steering angles; and
a second calculator configured to multiply a filtered value of the second steering angle error by the adjusted gain, and apply a result of the multiplication as the compensated value to the steering angle position control unit,
wherein the steering angle position control unit applies the compensated value to the first command current, and outputs a second command current.

4. The apparatus of claim 3, wherein the variable HPF adjusts the cut-off frequency by adjusting a derivative time of a transfer function.

5. The apparatus of claim 3, wherein the difference between the first and second current steering angles occurs when a belt slip occurs.

6. The apparatus of claim 5, wherein the gain adjuster adjusts the gain according to a level of a sensed belt slip.

7. The apparatus of claim 6, wherein the gain adjuster increases the gain when the belt slip is not sensed.

8. The apparatus of claim 5, wherein the gain adjuster reduces the gain as the difference between the first and second current steering angles increases.

9. The apparatus of claim 3, wherein the gain adjuster adjusts the gain by multiplying a load curve gain based on the difference between the first and second current steering angles, a current steering angular velocity and a preset ratio.

10. A method for controlling an MDPS, comprising:
compensating, by a steering angle position control unit, a first steering angle error corresponding to a difference between a command steering angle from an autonomous driving system and a first current steering angle from a steering angle sensor, and outputting a first command current, the outputting of the first command current comprising:
compensating, by a position controller, the first steering angle error and outputting a command velocity; and
compensating, by a velocity controller, a velocity error corresponding to the difference between a current steering angular velocity and the command velocity outputted from the position controller, and outputting the first command current;
compensating, by a responsiveness improvement unit, a second steering angle error corresponding to the difference between the command steering angle and a second current steering angle from a motor, and applying a compensated value of the second steering angle error to the steering angle position control unit; and
applying, by the steering angle position control unit, the compensated value to the first command current, and outputting a second command current.

11. The method of claim 10, wherein the applying of the compensated value to the steering angle position control unit comprises:
filtering, by a variable HPF, the second steering angle error through high-frequency filtering by adjusting a cut-off frequency;
adjusting, by a gain adjuster, a gain of the variable HPF based on the difference between the first and second current steering angles; and
multiplying, by a second calculator, a filtered value of the second steering angle error by the adjusted gain, and applying a result of the multiplication as the compensated value to the steering angle position control unit.

12. The method of claim 11, wherein in the filtering of the second steering angle error through high-frequency filtering, the variable HPF adjusts the cut-off frequency by adjusting a derivative time of a transfer function.

13. The method of claim 11, wherein in the adjusting of the gain of the variable HPF,
the difference between the first and second current steering angles occurs when a belt slip occurs.

14. The method of claim 13, wherein in the adjusting of the gain of the variable HPF,
the gain adjuster adjusts the gain according to a level of a sensed belt slip.

15. The method of claim 14, wherein in the adjusting of the gain of the variable HPF,
the gain adjuster increases the gain when the belt slip is not sensed.

16. The method of claim 13, wherein in the adjusting of the gain of the variable HPF,
the gain adjuster reduces the gain as the difference between the first and second current steering angles increases.

17. The method of claim 11, wherein in the adjusting of the gain of the variable HPF,
the gain adjuster adjusts the gain by multiplying a load curve gain based on the difference between the first and second current steering angles, a current steering angular velocity, and a preset ratio.

18. The method of claim 10, further comprising compensating, by a current controller, a current error between the second command current and a sensor current, outputting a final command current, and applying the final command current to the MDPS, after the outputting of the second command current.

* * * * *